(12) United States Patent
Musiige et al.

(10) Patent No.: US 8,712,742 B2
(45) Date of Patent: Apr. 29, 2014

(54) METHODS, DEVICES AND COMPUTER PROGRAM PRODUCTS PROVIDING FOR ESTABLISHING A MODEL FOR EMULATING A PHYSICAL QUANTITY WHICH DEPENDS ON AT LEAST ONE INPUT PARAMETER, AND USE THEREOF

(75) Inventors: Deogratius Musiige, Albertslund (DK); Vincent Laulagnet, Frederiskberg (DK)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/176,288

(22) Filed: Jul. 5, 2011

(65) Prior Publication Data

US 2013/0013270 A1    Jan. 10, 2013

(51) Int. Cl.
*G06F 7/60* (2006.01)
(52) U.S. Cl.
USPC ........................... 703/2; 703/3; 703/4; 703/5
(58) Field of Classification Search
USPC ............................................................ 702/2
See application file for complete search history.

(56) References Cited

U.S. PATENT DOCUMENTS

2011/0270590 A1* 11/2011 Aparin et al. ..................... 703/2

OTHER PUBLICATIONS

J. Haid et al., Power Emulation: Metodology and Applications for HW/SW Power Optimization, IEEE transaction, 2010.*
Yuanbin Guo, Efficient VLSI Architectures for Recursive Vandermonde QR Decomposition in Broadband OFDM Pre-distortion, IEEE transaction, 2005.*
Deogratius Musiige et al., RF power consumption emulation optimized with interval valued homotopies, 2011,World Academy of Science, Engineering and Technology.*
Bachmann, C., et al., "Automated Power Characterization for Run-Time Power Emulation of SoC Designs", © 2010 IEEE, pp. 587-594.
Radisic, V., et al., "Broad-Band Power Amplifier Using Dielectric Photonic Bandgap Structure", © 1998 IEEE, pp. 13-14.
Zhao, C., et al., "Constrained Clipping for Crest Factor reduction in Multiple-user OFDM", © 2007 IEEE, pp. 341-344.
Cui, X., "Efficient Radio Frequency Power Amplifiers for Wireless Communications", 2007 Ohio State University, 120 pgs.
Coburn, J., et al., "Hardware Accelerated Power Estimation", 2005, Proceedings of the Design, Automation and Test in Europe Conference and Exhibition, 2 pgs.
Racanelli, M., et al., "High Performance SiGe BiCMOS Technology", © 2005 IEEE, 4 pgs.
Ribeiro, C., et al., "Performance of Linear Multi-User MIMO Precoding in LTE System", © 2008 IEEE, pp. 410-414.

(Continued)

*Primary Examiner* — Omar Fernandez Rivas
*Assistant Examiner* — Iftekhar Khan (57) ABSTRACT

The present invention proposes methods, devices and computer program products. To this extent, there is defined a set X including N distinct parameter values $x\_i$ for at least one input parameter x, N being an integer greater than or equal to 1, first measured the physical quantity Pm1 for each of the N distinct parameter values $x\_i$ of the at least one input parameter x, while keeping all other input parameters fixed, constructed a Vandermonde matrix VM using the set of N parameter values $x\_i$ of the at least one input parameter x, and computed the model W for emulating the physical quantity P based on the Vandermonde matrix and the first measured physical quantity according to the equation $W=(VM^T*VM)^{-1}*VM^T*Pm1$. The model is iteratively refined so as to obtained a desired emulation precision. The model can later be used to emulate the physical quantity based on input parameters or logs taken from the field and thereby support device design optimization.

18 Claims, 4 Drawing Sheets

(56) References Cited

OTHER PUBLICATIONS

Groe, J., "Polar Transmitters for Wireless Communications", © 2007 IEEE, pp. 58-63.

Coburn, J., et al., "Power Emulation: A New Paradigm for Power Estimation", © 2005, DAC 2005 Jun. 13-17, 2005, Anaheim, California, pp. 700-705.

Haid, J., et al., "Power Emulation: Methodology and Applications for HW/SW Power Optimization", © 2010 IEEE, pp. 133-138.

Razavi, B., et al., "RF Transmitter Architectures and Circuits", © 1999 IEEE, pp. 197-204.

Rong, L., et al., "RF Transmitter Architecture Investigation for Power Efficient Mobile WiMAX Applications", © 2008, 8 pgs.

3GPP TS 36.101 V8.0.0 (Dec. 2007), Technical Specification, $3^{rd}$ Generation Partnership Project; Technical Specification Group Radio Access Network; Evolved Universal Terrestrial Radio Access (E-UTRA); User Equipment (UE) Radio Transmission and Reception (Release 8), (45 pages).

NI PXI/PCI-5922 Specifications, National Instruments, (2007), (28 pages).

3GPP TS 36.211 V8.9.0 (Dec. 2009), Technical Specification, $3^{rd}$ Generation Partnership Project; Technical Specification Group Radio Access Network; Evolved Universal Terrestrial Radio Access (E-UTRA); Physical Channels and Modulation (Release 8), (83 pages).

Allgower—Numerical Continuation Methods: An Introduction,(1990), (388 pages).

MIPI Alliance, http.//www.mipi.org/specifications/digrfsm-specifications, (2011), (6 pages).

Bishop, "Pattern Recognition and Machine Learning", (2006), (pp. 137-139).

Clarence, "Electrical Engineering: The Theory and Characteristics of Electrical Circuits and Machinery", (1917), (16 pages).

Baker, "Introduction to Interval Analysis", Chapter 2 (2009), (pp. 10-13).

* cited by examiner

METHODS, DEVICES AND COMPUTER PROGRAM PRODUCTS PROVIDING FOR ESTABLISHING A MODEL FOR EMULATING A PHYSICAL QUANTITY WHICH DEPENDS ON AT LEAST ONE INPUT PARAMETER, AND USE THEREOF

FIELD OF THE INVENTION

The present invention relates to methods, devices and computer program products providing for establishing a model for emulating a physical quantity which depends on at least one input parameter as well as those methods and devices which make use thereof and apply the established model for emulation.

More specifically, the present invention relates to such methods, devices and computer program products which are configured to establish a model for emulating power consumption, as the physical parameter, of at least partly analog devices. An example of such at least partly analog devices is a transmitter device used in mobile communication systems and comprising digital as well as analog components and the established model is applied to such devices for emulation of the power consumed by those devices. Nevertheless, the present invention is generally applicable for emulating an arbitrary physical quantity of an arbitrary system as long as the physical quantity depends on at least one input parameter to such system.

BACKGROUND

As an example for exemplifying the present invention, it is referred hereinafter to mobile data transmission and data services, which are constantly making progress. With the increasing penetration of such services, a need for increased bandwidth for conveying the data is emerging. Likewise, with an increased usage of mobile handheld devices, it is important that power consumption for those devices is minimized as they are operating on battery power which is rather limited and otherwise would need to be recharged frequently. Frequent recharging, however, represents a discomfort for the user and may also contribute to reduce the lifetime of the battery used. Power consumption is thus referred hereinafter as the physical quantity to be emulated in such system or a part thereof, such as analog transmitters.

Power estimation is thus a fundamental milestone in the design of hardware platforms such as transmitters, but also of any other hardware, because it enables power consumption optimization from the early stages of the hardware platform design. A power estimation paradigm called power emulation was introduced with the capabilities of estimating power with accuracies of less than 20% during the design phase of hardware platforms.

Currently available power emulation methodologies are, however, only compatible with digital hardware and/or designs. Thus, those emulation methods and devices can not unequivocally be applied for estimating the power consumption of at least partly analog devices such as a full transmission chain including a modulator/demodulator (hereinafter in short modem) (of e.g. a wireless handset device), which also include to a considerable extent analog devices.

The power consumption of such a modem is, however, a key performance factor for the entire device. The radio frequency (RF) transmitter is making a very significant contribution to the modem's overall power consumption. Measuring this contribution in a real life scenario is very challenging as it requires advanced test equipment and advanced analysis work (in order to isolate this specific contribution). Furthermore, this measurement can only be done very late in the modem development as it requires mature complete hardware, HW.

Figure 1:
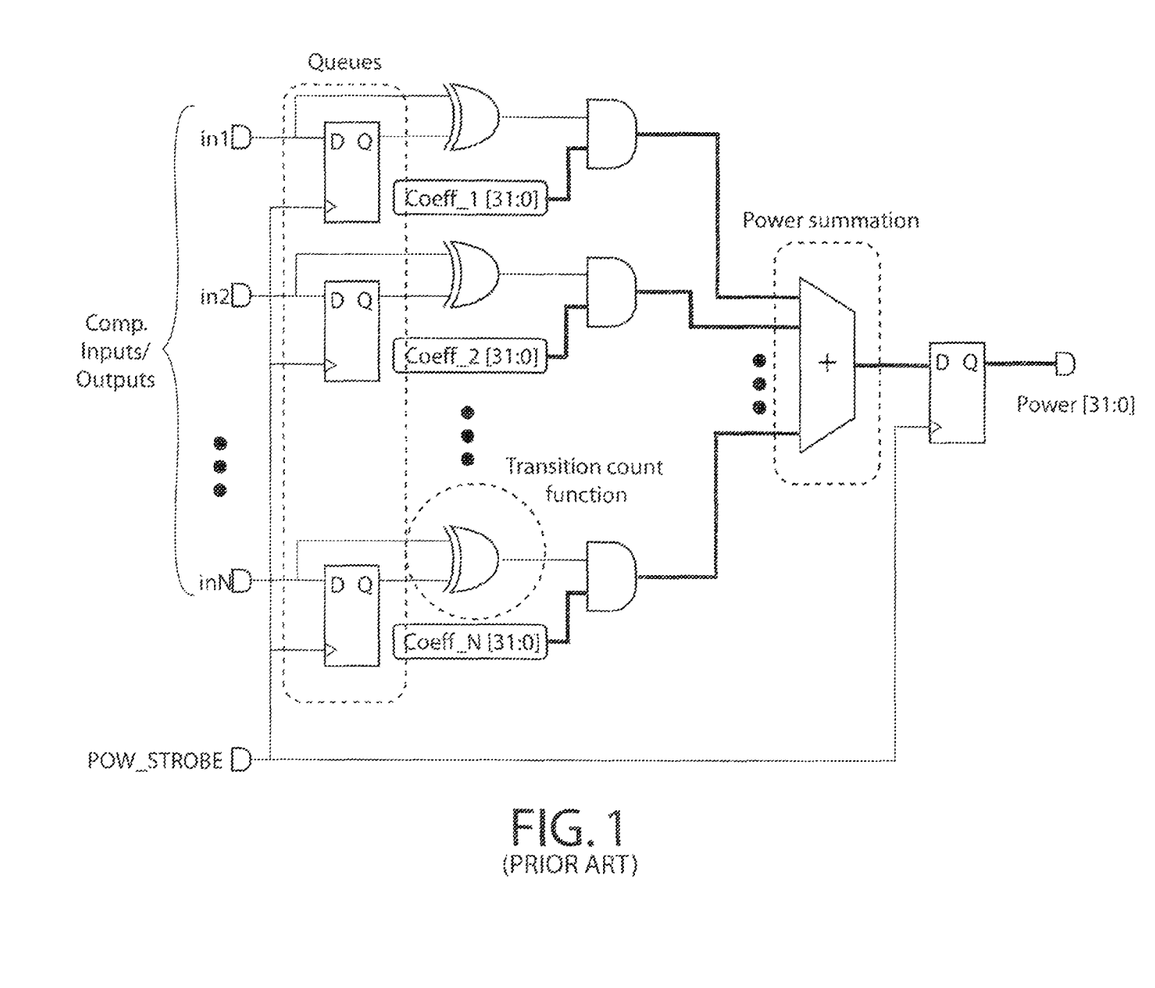
FIG. 1 schematically illustrates a prior art arrangement for emulating power consumption of digital devices.

A currently available power emulation methodology is based on a power model as shown in FIG. 1 which was introduced for the power emulation of digital designs from the register transfer level, RTL, of abstraction by J. Coburn, S. Ravi, and A. Raghunathan, in an article "Power emulation: a new paradigm for power estimation", in *Design Automation Conference, 2005. Proceedings. 42nd*, pages 700-705, 2005.

As shown in FIG. 1, that power model takes the values of the inputs/outputs of an RTL component as inputs and utilizes a respective flip-flop per input line in1 to inN to save a previous value. At a given clocking supplied via the signal line "POW STROBE", a current and the previous value of each input line, in1 to inN, (in FIG. 1) are evaluated to detect a binary transition by subjecting them to the XOR operation, and the result is AND gated with a power coefficient associated to the respective transition (in1, . . . , inN) to yield the corresponding power consumption. The coefficient may depend on the transistor size or technology used, or the like. Thereafter, the individual powers are summed in power summation and output to a further buffering flip-flop and then finally output.

It is, however, apparent that analog signals can not be evaluated in terms of a binary transition. Hence, given the continuous nature of the analog signals, the above power emulation model can not be used for power emulation of analog devices and/or at least partly analog devices such as RF transmitters.

Thus, there is still a need for further improvement in terms of proper power emulation for at least partly analog devices.

SUMMARY

The present invention addresses such situation and proposes, in exemplary embodiments, new solutions to efficiently provide methods, apparatuses and computer program products, respectively, for establishing and correspondingly applying a model for emulating a physical quantity which depends on at least one input parameter.

Various aspects and related examples of the invention are set out in the claims.

According to a first aspect of the present invention, there is provided a method, comprising: providing for establishing a model W for emulating a physical quantity P which depends on at least one input parameter x, defining a set X comprising N distinct parameter values $x\_i$ for said at least one input parameter x, N being an integer greater than or equal to 1, first measuring the physical quantity Pm1 for each of the N distinct parameter values $x\_i$ of the at least one input parameter x, while keeping all other input parameters fixed, constructing a Vandermonde matrix VM using said set of N parameter values $x\_i$ of said at least one input parameter x, and computing the model W for emulating the physical quantity PE based on the Vandermonde matrix and the first measured physical quantity according to the equation $W=(VM^T*VM)^{-}*VM^T*Pm1$; and as well there is provided an apparatus, comprising a device, provided for establishing a model W for emulating a physical quantity P which depends on at least one input parameter x, the device comprising an input module configured to receive a set X comprising N distinct parameter values $x\_i$ for said at least one input parameter x, N being an integer greater than or equal to 1, a first measurement module configured to first measure the physical quantity Pm1 for each of the N distinct parameter values $x\_i$ of the at least one input parameter x, while keeping all other input parameters fixed, a construction module configured to construct a Vandermonde matrix VM using said set of N parameter values x_i of said at least one input parameter x, and a computer module configured to compute the model W for emulating the physical quantity PE based on the Vandermonde matrix and the first measured physical quantity according to the equation $W=(VM^T*VM)^{-1}*VM^T*Pm1$.

Advantageous further developments are as set out in respective dependent claims thereof.

According to a further aspect thereof, there are provided computer program products comprising computer-executable components which, when executed on a computer, are configured to implement the respective methods as set our herein above. The above computer program product/products may be embodied as a computer-readable storage medium.

According to a second aspect of the present invention, there is provided a method, comprising providing for emulating a physical quantity PE, which depends on at least one input parameter x, extracting said at least one parameter x from an interface, and emulating said physical quantity by supplying said extracted parameter to a model W for emulation of the physical quantity obtained according to any of the above method aspects, and as well there is provided an apparatus, comprising a device configured to provide for emulating a physical quantity PE, which depends on at least one input parameter x, the device comprising an extractor module configured to extract said at least one parameter x from an interface, and an emulator module configured to emulate said physical quantity by supplying said extracted parameter to a model W for emulation of the physical quantity obtained by an apparatus according to any of the apparatus aspects.

Thus, improvement in relation to providing for establishing and correspondingly applying a model for emulating a physical quantity which depends on at least one input parameter is achieved by those methods, devices and computer program products, in connection with at least exemplary embodiments and/or aspects, as follows:

there is introduced an accurate emulation model that can be used in various phases of development of at least partly analog devices for emulating a physical parameter such as power consumption (e.g. emulation can be used in the design stage/prototyping stage and thus prior to series manufacturing as final hardware mass product);

it enables optimization for power consumption estimate, analysis and device design optimization;

it allows, in an application case where the physical quantity to be emulated is the power consumption of an analog radio frequency RF transmitter, the emulation of power consumption of the analog parts of such RF transmitter, and it allows power estimation for advanced real life scenarios in the field.

The model derived for the emulation in at least an aspect thereof encompasses the use of interpolation methods applied on measurements of a sample and/or prototype device, and has been evaluated for both, polynomial and spline interpolation methods, applied when modeling the emulation model.

Figure 3:
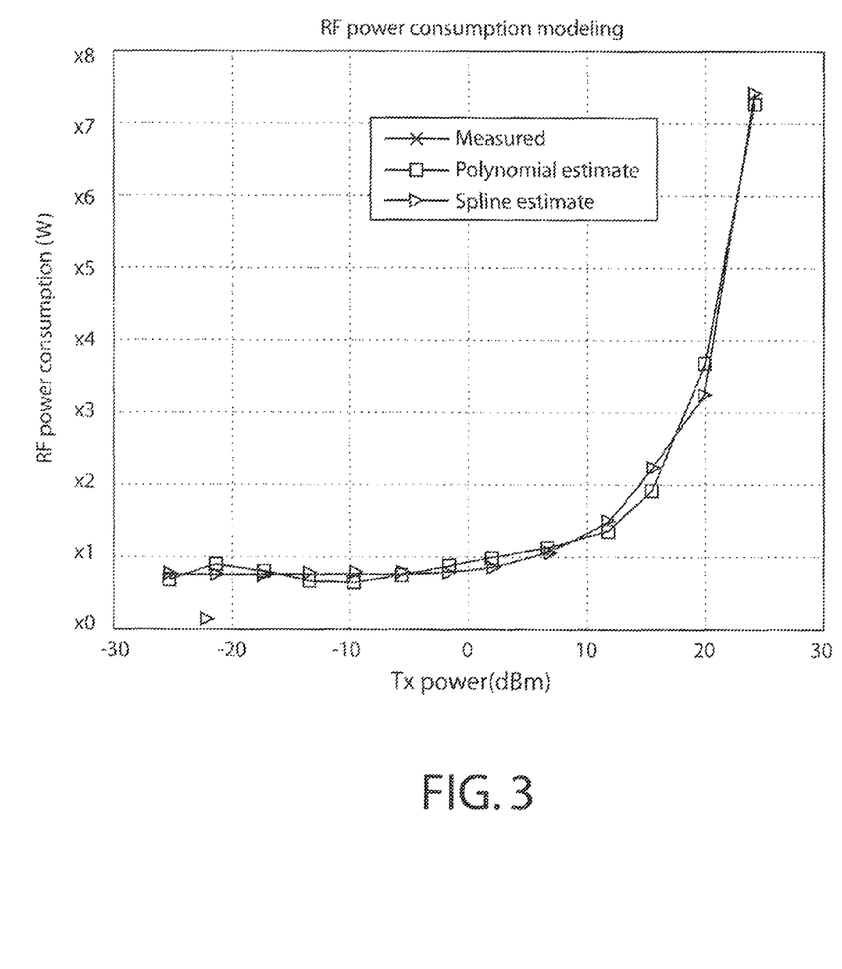
FIG. 3 schematically illustrates the dependencies of RF power consumption vs. transmit power "Tx power" for measured values, and emulated values, the emulation being based on interpolation applying a polynomial approach and a spline approach, respectively.

The evaluation for both is as depicted in FIG. 3. The comparison between the emulated power consumption and the measured power consumption showed that the polynomial approach had a maximum deviation of about 8% compared to about 0.02% of the spline approach. However, due to the computational complexity associated when modeling the emulation model with the spline approach, the polynomial interpolation approach is preferable at the cost of lower accuracy in most emulation application scenarios. However, in an emulation application in which a higher accuracy in the emulation result is desired or required, the emulation model can, of course, be based on the spline interpolation based approach.

When using the emulation model as proposed in addition to emulation models for estimating power consumption for "pure" digital devices, it is enabled to emulate the power consumption of the whole transceiver chain during runtime. In addition, given the fact that power consumption emulation can be performed during the design phase of the baseband, BB, and radio frequency, RF, devices, power consumption analysis can be conducted where hot spots are found and actions towards their minimization can be taken. Thus, by incorporating the available emulation methodologies for the baseband BB and the methodology presented in this paper, baseband BB and radio frequency RF device's design and operational scheduling can be implemented towards optimal power usage.

BRIEF DESCRIPTION OF DRAWINGS

For a more complete understanding of aspects and/or example embodiments of the present invention, reference is now made to the following description taken in connection with the accompanying drawings in which.

DESCRIPTION OF EXEMPLARY EMBODIMENTS

Exemplary aspects and/or embodiments of the invention will be described herein below.

It is to be noted that the following exemplary description refers to an environment for establishing a model for emulating a physical quantity which depends on at least one input parameter. Of course, the methodology presented herein below is applicable to any physical quantity and also to any device.

Nonetheless, in order to avoid the explanations to become too voluminous, the exemplary aspects/embodiments are described with particular reference to a device comprising at least partly analog devices such as an analog RF transceiver modulator/demodulator (modem) as used in e.g. handheld mobile communication devices such as so-called smart phones, or personal digital assistants PDA's or the like. Note that any other handheld or fixedly wired analog or mixed analog/digital devices or digital devices can be subjected to the present invention in terms of establishing a model for emulating a physical quantity thereof which depends on at least one parameter input thereto.

In addition, although the following explanations use as an example of a physical quantity the power consumption of the RF parts of the device, any other physical quantity, which depends on at least one input parameter, of a more or less complex device and/or system can be referred to for being emulated.

However, it is to be understood that this serves for explanatory purposes only. Thus, focusing in the subsequent description and explanation to RF transceivers/modems and to power consumption thereof is by no way intended to be construed as limiting the scope of the present invention.

First Aspect of the Invention:

A first aspect of the invention is to introduce a method and apparatus for emulating the power consumption (as an example of a physical quantity, which physical quantity depends on at least one input parameter) of an RF transmitter device which includes analog parts (as an example of device). This cannot be emulated by the prior art emulation methodologies.

The proposed emulation methodology may take the physical environmental variables such as temperature/humidity and the input parameters conveyed on the logical interface between the baseband and the RF device as inputs to derive and/or compute the emulated power consumption of the RF device. The emulated power is computed as a polynomial interpolation using polynomial basis functions, or using spline interpolation. Furthermore, the complexity of the emulation methodology has been designed so that it can be implemented in all phases of modem development (slow clock environment and real time target).

The polynomial interpolation is a method used to find a mathematic equation to a physical behavior which is in this case the function of the physical quantity vs. the one or more input parameters, i.e. the power curve as a function of e.g. transmit power. In addition, the power curve in this case is derived from a set of discrete measurements on a specific sample or prototype device.

Moreover, the parameters present on a logical interface of such sample/prototype may control, drive and/or influence the RF device in terms of the RF circuitry, which in turn may affect the power consumption of the RF part. The parameters extracted or tapped from the logical interface, however, are used to predict or derive the power consumption of the RF device based on the mathematical model that was set up before based on the interpolations.

In practice if the model (for the power curve) changes due to varied parameters and/or environment (e.g. variation of process of manufacturing, tolerance of RF components, inaccuracy in power alignment . . . ), the error between the model and actual measurements would increase in an unpredictable manner, thereby reducing the validity of the method.

In general, this approach depends very much on the accuracy of the measurement curve obtained from sample or prototype measurements and which is used for polynomial interpolation. In case the model used for the interpolation is found to be valid and/or precise enough, the method can best be applied to 50 ohm load as applying it with any other load may result in imprecise results.

And, if the Build Of Material BOM of a device changes, the whole procedure needs to be repeated, i.e. a respective model should be set up for each of useable materials such as Si, or GaAs, or the like; and/or for each of specific RF modem architectures, which may differ in terms of number of components used as well as in terms of their internal composition/interconnection.

Figure 4:
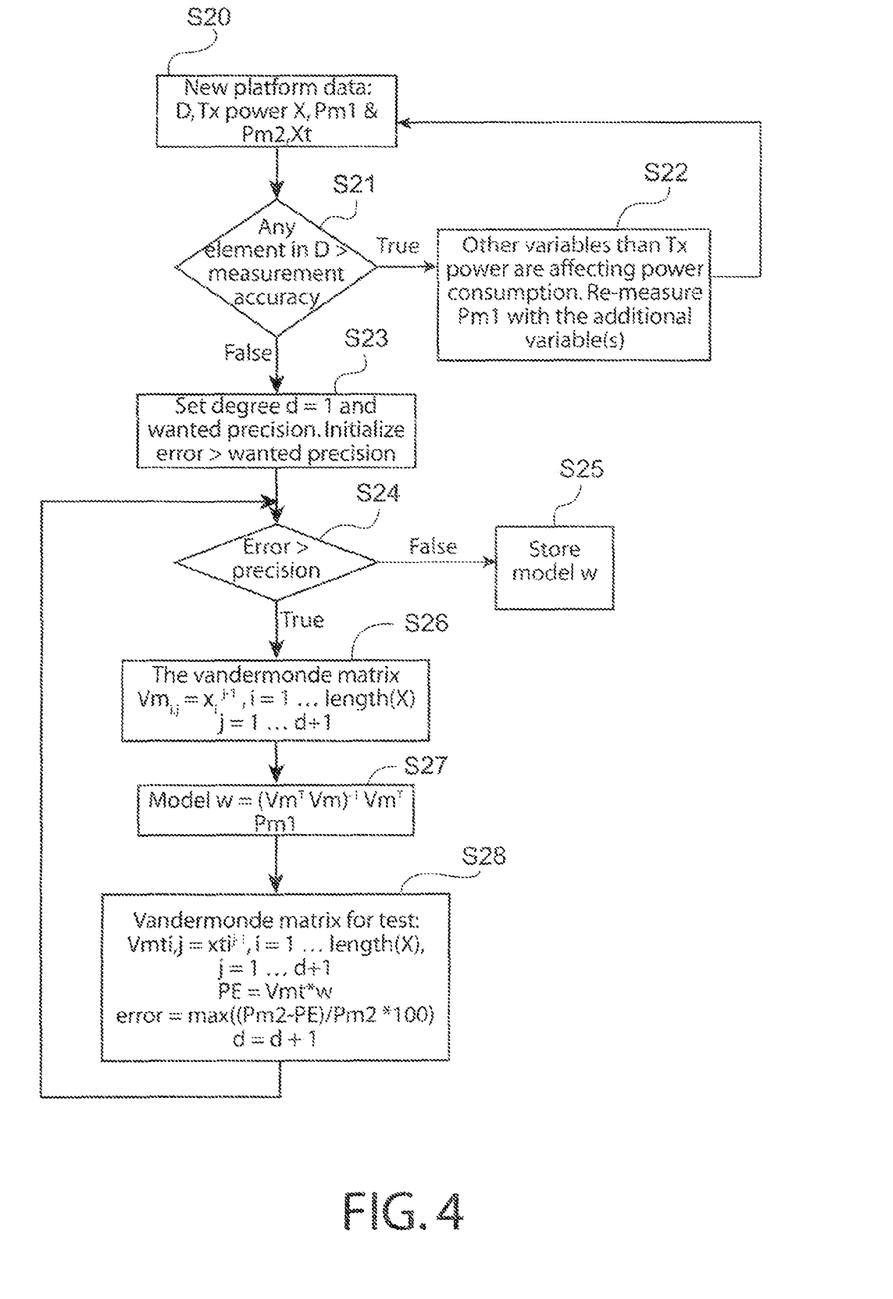
FIG. 4 schematically illustrates a flow chart illustrating an exemplary aspect/embodiment providing for establishing a model for emulating a physical quantity which depends on at least one input parameter.

FIG. 4 shows a flowchart of a method according to an exemplary embodiment of this aspect of the present invention.

In a first stage or step, S20, new platform data for deriving the emulation model are obtained and/or acquired.

In this regard, with reference to the specific example, input parameters that may need consideration for the deriving of the emulation model are those that may influence power consumption of the RF transmitter device of interest.

In case of an uplink SF-FDMA signal (single carrier frequency division multiple access signal) as currently used in LTE (long term evolution) mobile communication system for uplink, those parameters may be     the uplink bandwidth BW, typically 1.4, 3, 5, 10, 15, or 20 MHZ     the modulation scheme used, typically QPSK, 16QAM, or 64 QAM (quadrature phase shift keying, quadrature amplitude modulation)

the transmit power Tx, typically e.g. between −40 and +23 dBm     the carrier frequencies fc (as defined for e.g. the LTE bands), typically between 704 MHz and 2570 MHz.

Moreover, environmental parameters such as temperature T and/or humidity H may influence power consumption. Though, for normal applications of such devices, in case of operation under room temperature, a significant influence of those parameters should not be expected and could thus be neglected. However, in case of such or other devices being subject to extreme application scenarios such as in arctic as well as in tropic or in space environment, temperature or other environmental parameters may be treated and considered like those mentioned above in terms of evaluation for deriving the emulation model.

Namely, among the parameters, at least one input parameter x such as transmit power Tx may be expected or known to influence/determine the physical quantity such as power consumption to be emulated. A set comprising N distinct parameter values, N being greater than or equal to 1, is defined for that input parameter. Hence, a vector X comprising N distinct values $x\_i$ ($1<=i<=N$) for the transmit power Tx will be defined. For example, X=[−10, −5, 0, 3, 8, 11, 16, 20, 23] dBm, thus with N=9.

Then, a first measuring of the physical quantity, Pm1, for each of the N distinct parameter values $x\_i$ of the at least one input parameter x will take place, while keeping all other input parameters fixed. For this measuring, all other input parameters will be fixed on their respective maximum value. Data set Pm1 will serve to derive the emulation model.

Then, a second measuring of the physical quantity, Pm2, for each of the N distinct parameter values will take place. These N parameter values used for the second measurement Pm2 are $x\_i$ plus a number drawn from a normal distribution of variance 1 and mean 0, as explained also herein below. Pm2 will be measured with the same constant variables/parameters as Pm1 (where Xt is used instead of Xi), but independently of Pm1. This means that when Pm1 has been measured, the prototype device serving as a measurement basis for setting up the emulation model is powered down for e.g. 4-6 hours, at least long enough for the second measurement being uninfluenced by any settings/circumstances prevailing during the first measurement, and then powered up again to measure Pm2. (Pm2 may later also be called the "test data", and the error the between Pm2 and the emulated value of the physical quantity the "test error".)

On the other hand, the following measurements are effected:

For all input parameters, i.e. in the above referenced example limited to bandwidth, modulation scheme, transmit power and the carrier frequencies, the physical quantity of interest, i.e. in this example a power consumption value, is measured for the situation in which all parameters are set to the respective maximum value, and then, respective power consumption values are measured for the situations in which only a respective single one of those parameters was changed to its minimum value. Knowing or expecting that transmit power will anyway have an influence on the power consumption, only the other 3 parameters in this example will individually be set to their lower boundary in subsequent measurements. However, in cases in which it is unknown which parameter will actually have a significant influence on the physical quantity, also the (presumed influencing) input parameter "transmit power" will be changed to its minimum value.

Then, differences will be calculated between measurement values that were obtained for only a single one of those parameters having changed between its maximum and minimum value, so as to form a vector D of those differences.

Thus, given a wireless device platform, the following illustrates how the power emulation model is prepared to be derived.

Required inputs obtained/acquired in relation to S20:

Physical power measurements P1 . . . P6, where (BW=bandwidth, f=carrier frequency, TxP=Txpower):

$P1=P(BW=1.4 \text{ MHz}; f=2570 \text{ MHz}; TxP=23 \text{ dBm}; 64QAM)$, $P2=P(BW=20 \text{ MHz}; f=2570 \text{ MHz}; TxP=23 \text{ dBm}; 64QAM)$, $P3=P(BW=20 \text{ MHz}; f=704 \text{ MHz}; TxP=23 \text{ dBm}; 64QAM)$, $P4=P2$, $P5=P(BW=20 \text{ MHz}; f=2570 \text{ MHz}; TxP=23 \text{ dBm}; QPSK)$, $P6=P4$ will reveal a vector D of differences $D=[P2-P1; P4-P3; P6-P5]$.

With a Tx power vector of $X_i$, i=1 . . . N (N=9 in this example), distinct parameter values $X=[-10; -5; 0; 3; 8; 11; 16; 20; 23]$ dBm, as mentioned above, measurement vectors/matrices for first and second measurements will be obtained as $Pm1=P(x_i; 20 \text{ MHz}; 2570 \text{ MHz}; 64QAM)$ $Pm2=P(xt_i; 20 \text{ MHz}; 2570 \text{ MHz}; 64QAM)$.

Pm2 is independently measured from Pm1.

Note that the second measurement Pm2 is based on an input $xt_i$, described below. Namely, for subsequent testing/verification purposes, based on a vector of length(X), i.e. here N=9 elements, whose elements are computed from a normal distribution with mean 0 and variance 1, i.e. $V=[N(0; 1); N(0; 1); \ldots; N(0; 1)]$ a matrix $Xt=X+V$ is derived. (X being the vector used for the first measurement.) Thus, these N parameter values used for the second measurement Pm2 are x_i plus a number drawn from a normal distribution of variance 1 and mean 0. Based on Xt, also a Vandermonde matrix for test $Vmt\_i, j = xt_i^{j-1}$, i=1 . . . length(X), j=1 . . . d+1 is set up.

With those platform data D, Tx power X, Xt, Pm1 & Pm2 being defined and set up, the flow proceeds to stage/step S21. In step S21, it is checked whether any element in vector D has a value that is greater than a measurement accuracy of the measurement equipments used. If yes ("true"), this indicates, as shown in step S22, that another variable(s) than the "expected" Tx power affects the measured physical quantity "power consumption". In particular, the variable that contributes to the element in vector D that exceeded the measurement accuracy will be identifiable as the variable that (additionally) affects the power consumption. In such case, Pm1 will have to be re-measured with the additional variable(s).

This means that hereinbefore, Pm1 was measured for a single variable parameter only, i.e. a one-dimensional measurement was conducted, while in such case as in S22, a re-measurement will have to be conducted 2- or n-dimensionally, depending on how many variables are actually affecting the physical quantity of interest.

For such a multi-dimensional scenario, it is assumed that for a specific device, both the Tx power xi; i=1; . . . ;N and bandwidth zj; j=1; . . . ;M affect power consumption.

Then, the first measurement Pm1 will be obtained as $$Pm1 = \begin{matrix} P(x1; z1) & P(x1; z2) & P(x1; z3) & \ldots & P(x1; zM) \\ P(x2; z1) & P(x2; z2) & \ldots & & \ldots \\ P(x3; z1) & \ldots & P(x3; z3) & \ldots & \\ & & & P(x4; z4) & \ldots \\ & & & \ldots & \\ P(xN; z1) & & \ldots & & P(xN; zM) \end{matrix}$$

Note that for the purpose of simplifying the computation of the model (to be explained below in more detail), in such multidimensional (i.e. here 2-dimensional) scenario, Pm1 is row-wise made into a column vector of 1×NM. A Vandermonde matrix VM (for a degree d=2) is a 6*NM matrix:

$$VM = \begin{matrix} z1 \wedge 2 & z1 & z1x1 & x1 \wedge 2 & x1 & 1 \\ z2 \wedge 2 & z2 & z2x1 & x1 \wedge 2 & x1 & 1 \\ z3 \wedge 2 & z3 & z3x1 & x1 \wedge 2 & x1 & 1 \\ \ldots & & & & & 1 \\ zM \wedge 2 & zM & zMx1 & x1 \wedge 2 & x1 & 1 \\ \ldots & & \ldots & & & 1 \\ zM \wedge 2 & zM & zMxN & xN \wedge 2 & xN & 1 \end{matrix}$$

If, however, in step S21 it is confirmed that no element in vector D exceeds the measurement accuracy ("false"), this denotes that no other parameter (except the presumed one, Tx power in this example) influences the power consumption, and the process proceeds to step S23.

In step S23, for a subsequent computation of a model for the physical parameter of interest (e.g. power consumption) based on polynomial interpolation, a Vandermonde matrix approach is used. To this extent, a degree d for the Vandermonde matrix is initialized to d=1. In addition, an error (or test error) between the secondly measured data and the emulation/calculation data is initialized to be greater than a wanted precision (of e.g. 5%, or 10%).

In step S24 it is checked whether the (test) error is greater than the desired precision. Due to the initialization in the preceding step S23, this will be "true" upon such initial checking, and the process proceeds to step S26. If, after iterations to be described later, the check in step S24 reveals "false", this indicates that the model has been derived with the desired precision and iterations can be stopped and the model W will be stored for future use in emulations in step S25.

In step S26, a Vandermonde matrix VM for the number of elements of vector X, i.e. length of X is set up (N elements as described above), and the matrix is filled with a number of columns up to the degree d; i.e. is filled with columns up to a power of j−1, for j=1 . . . d+1. That is, $VM_{i,j} = x_i^{j-1}$, for i=1 . . . length(X)=N, and j=1 . . . d+1

Then, in step S27, a model W is calculated in an iteration step as $W=(VM^T \ VM)^{-1}*VM^T*Pm1$. Note that the operation "$^T$" denotes the transposed matrix, while operation "$^{-1}$" denotes the inverse matrix.

In a following step S28, the model is tested in terms of its precision. Namely, using the Vandermonde matrix for test $$VMt_{i,j}=xt_i^{j-1}, \text{ for } i=1 \ldots \text{length}(X), j=1 \ldots d+1,$$

the emulation result PE is obtained as $$PE=VMt*w,$$

with a test error $$error=\max((Pm2-PE)/Pm2*100),$$

and thereafter, the degree d is incremented by 1, i.e. d=d+1.

The process then proceeds back to step S24, and the test error is compared to the desired precision. If the error is still greater than the desired precision, the steps S26, S27, and S28 are repeated, until in S24 it is found that the error is not greater than the desired precision. Then the iterative determination/calculation of the model is terminated and the latest model W is stored, step S25, for subsequent use in an emulation system such as a power emulation system shown in FIG. 2.

Figure 2:
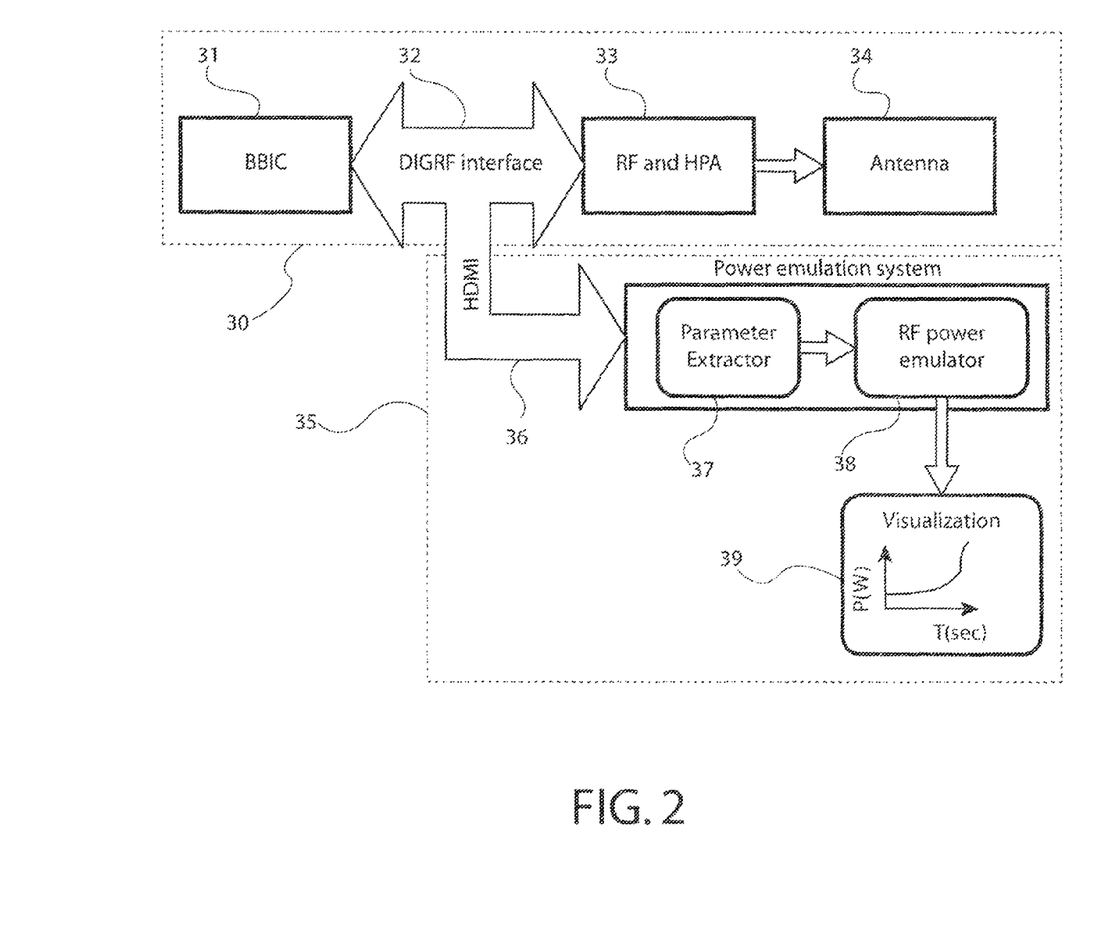
FIG. 2 schematically illustrates an arrangement for emulating power consumption of at least partly analog devices according to an exemplary aspect/embodiment of the present invention.

Second Aspect of the Invention:

The power emulation system 35 for emulating the power consumption of the RF device 30 (including its analog parts) is depicted in FIG. 2.

The RF device 30 comprises a baseband integrated circuit BBIC 31, a digital RF interface DIGRF 32 interfacing the BBIC 31 to a radio frequency and high power amplifier (RF & HPA) module 33, which in turn is connected to an antenna 34.

The power emulation system 35 listens/taps on the physical interface 32 between the baseband and RF device for the predefined power influencing logical interface parameters (as e.g. described above in detail) that are theoretically and practically proven to be the RF device power consumption influencing parameters. These parameters, such as frequency, bandwidth, Tx power and modulation scheme, optionally together with the physical environmental variables, such as temperature and humidity, and/or others are used to compute the emulated power, based on the emulation model W derived as disclosed above using polynomial interpolation. As long as these parameters are related to the actual RF behavior, the model can be used to predict (a priori) and not to confirm (a posteriori) a behavior.

A different model should be used for different RF modules which differ in terms of architecture and/or material or the like.

The power emulation system 35 depicted in FIG. 2 is made up of two modules, the "parameter extractor" module 37 and the "RF power emulator" module 38. The "parameter extractor" module 37 listens on the BBIC/RF device physical interface 32, 36 for the predefined logical interface parameters. Such interface may be conforming to the HDMI (high definition multimedia input) standard, but also to other standards.

At a given time t and temperature T, the "RF power emulator" module 38 computes the emulated power as a polynomial interpolation using the combination of the logical interface parameters (at time t) as inputs based on the stored model W (that was iteratively determined as disclosed above). Such module can be implemented to a processor such as a CPU or an application specific integrated circuit ASIC, or the like.

A visualization module 39 can be in the form of a either a host PC or a screen application on a mobile/wireless handset, and used to visualize the estimated power consumption as the physical quantity of interest.

It is to be understood that embodiments of the present invention according to the first and/or second aspect mentioned herein above may be implemented in software, hardware, application logic or a combination of software, hardware and application logic. The software, application logic and/or hardware generally, but not exclusively, may reside on a "parameter analyzing/estimation tool" at least similar to a signal/logic analyzer or any other test/measurement equipment. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

If desired, at least some of different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes methods, devices and computer program products in relation to providing for establishing a model W for emulating a physical quantity P which depends on at least one input parameter x. To this extent, there is defined a set X comprising N distinct parameter values x_i for said at least one input parameter x, N being an integer greater than or equal to 1, first measured the physical quantity Pm1 for each of the N distinct parameter values x_i of the at least one input parameter x, while keeping all other input parameters fixed, constructed a Vandermonde matrix VM using said set of N parameter values x_i of said at least one input parameter x, and computed the model W for emulating the physical quantity PE based on the Vandermonde matrix and the first measured physical quantity according to the equation $W=(VM^T*VM)^{-1}*VM^T*Pm1$. The model is iteratively refined so as to obtained a desired emulation precision. The model can later be used to emulate the physical quantity based on input parameters or logs taken from the field and thereby support device design optimization.

LIST OF ACRONYMS, ABBREVIATIONS AND DEFINITIONS

RTL: Register Transfer Level
RF: Radio Frequency
BBIC: Baseband Integrated Circuit
HPA: High Power Amplifier
SW: Software
HW: hardware

What is claimed is:

1. A method, comprising:
   providing by a device for establishing a model W for emulating a physical quantity P which depends on at least one input parameter x, defining by the device a set X comprising N distinct parameter values x_i for said at least one input parameter x, N being an integer greater than or equal to 1, measuring by the device a first measuring of the physical quantity P, Pm1 for each of the N distinct parameter values x_i of the at least one input parameter x, while keeping all other input parameters fixed, constructing by the device a Vandermonde matrix VM using said set of N parameter values x_i of said at least one input parameter x, and computing by the device the model W for emulating the physical quantity P based on the Vandermonde matrix and the first measured physical quantity Pm1 according to the equation $W=(VM^T*VM)^{-1}*VM^T*Pm1$.

2. The method according to claim 1, wherein the measuring comprises keeping all input parameters other than the at least one input parameter x fixed on their respective maximum value.

3. The method according to claim 1, wherein the constructing comprises
setting a precision for the emulation, and
iteratively constructing the Vandermonde matrix VM from a first degree to a degree d that satisfies said set precision.

4. The method according to claim 3, further comprising, for each iteration,
calculating an emulation result PE for said quantity by multiplying a constructed Vandermonde test matrix VMt with the computed model W according to the equation PE=VMt*W, wherein the test matrix is derived based on a matrix Xt=X+V, V=[N(0; 1);N(0; 1); . . . ;N(0; 1)] whose elements are drawn from a normal distribution with mean 0 and variance 1.

5. The method according to claim 4, further comprising,
measuring a second measuring of the physical quantity P, Pm2 for each of N distinct parameter values xt_i, independently of the first measuring of the physical quantity Pm1, and, for each iteration,
determining a maximum relative error between the emulation result PE and the second measured physical quantity Pm2 according to the equation error=max(*Pm2−PE*)/*Pm2**100 and
incrementing the degree of the Vandermonde matrix if the determined maximum relative error exceeds said set precision.

6. The method according to claim 5, further comprising
terminating the iterative construction of the Vandermonde matrix VM and storing the computed model W if the determined maximum relative error does not exceed said set precision.

7. The method according to claim 1, further comprising
pre-evaluating whether the physical quantity P to be emulated depends on another parameter than said at least one input parameter x.

8. The method according to claim 7, wherein the pre-evaluating comprises,
for a set of k parameters other than said at least one input parameter x,
measuring the physical quantity, for each of said k parameters when set to its respective maximum and minimum value, while keeping said at least one input parameter x and k−1 other parameters to its respective maximum value,
calculating the difference between the measured physical quantity for each of said k parameters when set to its maximum and to its minimum, respectively, comparing each of the differences with a measurement accuracy of measurement equipments used, and
if any of said differences exceeds the measurement accuracy, evaluating that the corresponding parameter affects the physical quantity.

9. An apparatus, comprising
a device, provided for establishing a model W for emulating a physical quantity P which depends on at least one input parameter x,
the device comprising
an input module configured to receive a set X comprising N distinct parameter values x_i for said at least one input parameter x, N being an integer greater than or equal to 1,
a first measurement module configured to measure a first measuring of the physical quantity P, Pm1 for each of the N distinct parameter values x_i of the at least one input parameter x, while keeping all other input parameters fixed,
a construction module configured to construct a Vandermonde matrix VM using said set of N parameter values x_i of said at least one input parameter x, and
a computer module configured to compute the model W for emulating the physical quantity P based on the Vandermonde matrix and the first measured physical quantity according to the equation $W=(VM^T*VM)^{-1}*VM^T*Pm1$.

10. The apparatus according to claim 9, wherein the measurement module is configured to keep all input parameters other than the at least one input parameter x fixed on their respective maximum value.

11. The apparatus according to claim 9, wherein the construction module is configured to
set a precision for the emulation, and
iteratively construct the Vandermonde matrix VM from a first degree to a degree d that satisfies said set precision.

12. The apparatus according to claim 11, wherein said computer module is configured, for each iteration,
to calculate an emulation result PE for said quantity by multiplying a constructed Vandermonde test matrix VMt with the computed model W according to the equation PE=VMt*W, wherein the test matrix is derived based on a matrix Xt=X+V, V=[N(0; 1);N(0; 1); . . . ;N(0; 1)] having a normal distribution with mean 0 and variance 1.

13. The apparatus according to claim 12, further comprising,
a second measurement module configured to measure a second measuring of the physical quantity P, Pm2 for each of N distinct parameter values xt_i, while keeping all other input parameters fixed, independently of the first measured physical quantity Pm1,
and,
a determination module configured to determine, for each iteration,
a maximum relative error between the emulation result PE and the second measured physical quantity Pm2 according to the equation error=max(*Pm2−PE*)/*Pm2**100 and
to increment the degree of the Vandermonde matrix, if the determined maximum relative error exceeds said set precision.

14. The apparatus according to claim 13, wherein
the determination module is configured to terminate the iterative construction of the Vandermonde matrix VM and to store the computed model W, if the determined maximum relative error does not exceed said set precision.

15. The apparatus according to claim 9, further comprising a pre-evaluation module configured to pre-evaluate whether the physical quantity P to be emulated depends on another parameter than said at least one input parameter x.

16. The apparatus according to claim 15, wherein the pre-evaluation module is configured, for a set of k parameters other than said at least one input parameter x, to measure the physical quantity, for each of said k parameters when set to its respective maximum and minimum value, while keeping said at least one input parameter x and k−1 other parameters to its respective maximum value, to calculate the difference between in the measured physical quantity for each of said k parameters when set to his maximum and to its minimum, respectively, to compare each of the differences with a measurement accuracy of measurement equipment used, and if any of said differences exceeds the measurement accuracy, to evaluate that the corresponding parameter affects the physical quantity.

17. A computer program product comprising a non-transitory computer readable storage medium storing computer-executable components which, when executed on a computer, are configured to at least:

provide for establishing a model W for emulating a physical quantity P which depends on at least one input parameter x, define a set X comprising N distinct parameter value x_i for said at least one input parameter x, N being an integer greater than or equal to 1, measure a first measuring of the physical quantity P, Pm1 for each of the N distinct parameter values x_i of the at least one input parameter x, while keeping all other input parameters fixed, construct a Vandermonde matrix VM using said set of N parameter values x_i of said at least one input parameter x, and compute the model W for emulating the physical quantity P based on the Vandermonde matrix and the first measured physical quantity according to the equation $W=(VM^T*VM)^{-1}*VM^T*Pm1$.

18. An apparatus, comprising a device configured to provide for emulating a physical quantity P, which depends on at least one input parameter x, the device comprising an extractor module configured to extract said at least one parameter x from an interface, and an emulator module configured to emulate said physical quantity P by supplying said extracted parameter to a model W for emulation of the physical quantity obtained by an apparatus according to claim 9.

* * * * *